(12) United States Patent
Bai et al.

(10) Patent No.: US 11,503,155 B2
(45) Date of Patent: Nov. 15, 2022

(54) INTERACTIVE VOICE-CONTROL METHOD AND APPARATUS, DEVICE AND MEDIUM

(71) Applicant: BAIDU ONLINE NETWORK TECHNOLOGY (BEIJING) CO., LTD., Beijing (CN)

(72) Inventors: Jinfeng Bai, Beijing (CN); Chuanlei Zhai, Beijing (CN); Xu Chen, Beijing (CN); Tao Chen, Beijing (CN); Xiaokong Ma, Beijing (CN); Ce Zhang, Beijing (CN); Zhen Wu, Beijing (CN); Xingyuan Peng, Beijing (CN); Zhijian Wang, Beijing (CN); Sheng Qian, Beijing (CN); Guibin Wang, Beijing (CN); Lei Jia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 138 days.

(21) Appl. No.: 17/031,598

(22) Filed: Sep. 24, 2020

(65) Prior Publication Data
US 2021/0127003 A1    Apr. 29, 2021

(30) Foreign Application Priority Data
Oct. 28, 2019  (CN) .......................... 201911033410.5

(51) Int. Cl.
*H04M 3/493*    (2006.01)
*G10L 15/06*    (2013.01)
(Continued)

(52) U.S. Cl.
CPC ......... *H04M 3/4936* (2013.01); *G10L 15/063* (2013.01); *G10L 15/16* (2013.01);
(Continued)

(58) Field of Classification Search
CPC .... H04M 3/4936; G10L 15/063; G10L 15/16; G10L 15/1822; G10L 15/22;
(Continued)

(56) References Cited

U.S. PATENT DOCUMENTS 9,437,186 B1     9/2016 Liu et al.
11,195,531 B1 *  12/2021 Adams ................ H04M 3/5166
(Continued)

FOREIGN PATENT DOCUMENTS

CN    104956436 A    9/2015
CN    107437417 A    12/2017
(Continued)

OTHER PUBLICATIONS

Office Action for Japanese Application No. 2020-170837, dated Nov. 9, 2021, 5 pages.
(Continued)

*Primary Examiner* — Akelaw Teshale
(74) *Attorney, Agent, or Firm* — Fay Sharpe LLP

(57) ABSTRACT

The present disclosure discloses an interactive voice-control method and apparatus, a device and a medium. The method includes: obtaining a sound signal at a voice interaction device and recognized information that is recognized from the sound signal; determining an interaction confidence of the sound signal based at least on at least one of an acoustic feature representation of the sound signal and a semantic feature representation associated with the recognized information; determining a matching status between the recognized information and the sound signal; and providing the interaction confidence and the matching status for controlling a response of the voice interaction device to the sound signal.

20 Claims, 8 Drawing Sheets

(51) Int. Cl.
*G10L 15/16* (2006.01)
*G10L 15/18* (2013.01)
*G10L 15/22* (2006.01)

(52) U.S. Cl.
CPC .......... *G10L 15/1822* (2013.01); *G10L 15/22* (2013.01); *G10L 2015/226* (2013.01)

(58) Field of Classification Search
CPC ... G10L 2015/226; G10L 25/78; G10L 15/02; G10L 15/04; G10L 15/26; G10L 15/28; G10L 15/30; G10L 2015/223; G06F 40/35; G06F 40/30
See application file for complete search history.

(56) References Cited

U.S. PATENT DOCUMENTS

| | | | | |
|---|---|---|---|---|
| 2004/0030556 | A1* | 2/2004 | Bennett | G06F 40/289 704/E15.04 |
| 2006/0020462 | A1* | 1/2006 | Reich | G10L 15/187 704/E15.02 |
| 2006/0116877 | A1* | 6/2006 | Pickering | G10L 15/08 704/231 |
| 2009/0198496 | A1* | 8/2009 | Denecke | G10L 15/26 704/257 |
| 2010/0324896 | A1* | 12/2010 | Attwater | G10L 15/08 704/238 |
| 2011/0054901 | A1 | 3/2011 | Ibm | |
| 2015/0294666 | A1 | 10/2015 | Miyasaka et al. | |
| 2016/0180853 | A1* | 6/2016 | VanLund | G10L 17/22 704/275 |
| 2017/0018269 | A1* | 1/2017 | Lev | G10L 15/19 |
| 2018/0130463 | A1* | 5/2018 | Jeon | G06F 16/353 |
| 2019/0013024 | A1* | 1/2019 | Jeon | G10L 15/16 |
| 2019/0295564 | A1 | 9/2019 | Li et al. | |
| 2019/0311722 | A1* | 10/2019 | Caldwell | G10L 17/06 |
| 2020/0012883 | A1* | 1/2020 | Kuo | G06K 9/6289 |

FOREIGN PATENT DOCUMENTS

| | | | |
|---|---|---|---|
| CN | 107665708 A | 2/2018 | |
| CN | 108694940 A | 10/2018 | |
| CN | 109036384 A | 12/2018 | |
| CN | 109461446 A | 3/2019 | |
| JP | 2014103099 A | 6/2014 | |
| TW | 201941185 A | 10/2019 | |
| WO | WO-2019203795 A1 * | 10/2019 | G06F 3/167 |

OTHER PUBLICATIONS

Office Action for Chinese Application No. 201911033410.5, dated Jun. 22, 2020, 18 pages.
"Acoustic Model of Automatic Speech Recognition: A Survey", Journal of Yanshan University, vol. 41, No. 6, Nov. 2017, 11 pages (English Abstract).

* cited by examiner (a) Deletion Error (b) Insertion Error (c) Replacement Error

INTERACTIVE VOICE-CONTROL METHOD AND APPARATUS, DEVICE AND MEDIUM

CROSS REFERENCE TO RELATED APPLICATION

This application claims priority under 35 U.S.C. § 119(a) on Chinese Patent Application No. 201911033410.5, filed with the State Intellectual Property Office of P. R. China on Oct. 28, 2019, the entire contents of which are incorporated herein by reference.

TECHNICAL FIELD

Embodiments of the present disclosure mainly relate to the field of artificial intelligence, and more particularly, to applications in speech technologies.

BACKGROUND

Voice interaction technology is a technology in which humans and machines interact with voice, realizing a voice interaction experience similar to natural dialogues. From the interaction of the mouse and keyboard with the screen in the computer era to the direct interaction with the touch screen in the era of the smart phone, human-machine interaction is getting simpler and simpler, and the threshold to interaction is getting lower and lower. With the vigorous development of artificial intelligence and mobile Internet, human-like natural voice interaction has gradually become a new type of human-machine interaction. Featured by advantages such as large input bandwidth, high accuracy, good mobility, and low use threshold, voice interaction is one of the preferred interaction methods for human-machine interaction.

Voice interaction can be divided into two scenarios: one-wakeup-one-interaction, and one-wakeup-successive-interaction (also known as one wakeup for several interactions). In the process of implementing voice interaction, speech recognition is usually performed on collected sound signals to recognize corresponding information for implementing interactive control.

SUMMARY

According to embodiments of the present disclosure, a solution for controlling voice interaction is provided.

In a first aspect of the present disclosure, an interactive voice-control method is provided. The method includes: obtaining a sound signal at a voice interaction device and recognized information that is recognized from the sound signal; determining an interaction confidence of the sound signal based at least on at least one of an acoustic feature representation of the sound signal and a semantic feature representation associated with the recognized information; determining a matching status between the recognized information and the sound signal; and providing the interaction confidence and the matching status for controlling a response of the voice interaction device to the sound signal.

In a second aspect of the present disclosure, an interactive voice-control apparatus is provided. The apparatus includes: an obtaining module, configured to obtain a sound signal at a voice interaction device and recognized information that is recognized from the sound signal; an interaction confidence determination module, configured to determine an interaction confidence of the sound signal based at least on at least one of an acoustic feature representation of the sound signal and a semantic feature representation associated with the recognized information; a matching status determination module, configured to determine a matching status between the recognized information and the sound signal; and a providing module, configured to provide the interaction confidence and the matching status for controlling a response of the voice interaction device to the sound signal.

In a third aspect of the present disclosure, an electronic device is provided. The electronic device includes one or more processors, and a storage device configured to store one or more programs. When the one or more programs are executed by the one or more processors, the one or more processors are configured to implement the method of the first aspect of the present disclosure.

In a fourth aspect of the present disclosure, a computer-readable storage medium having a computer program stored thereon is provided. When the program is executed by a processor, the program implements the method of the first aspect of the present disclosure.

It should be understood that what is described in the Summary is not intended to define key or important features of embodiments of the present disclosure, nor is it intended to limit the scope of the present disclosure. Other features of the present disclosure will become easier to be understood through the following description.

BRIEF DESCRIPTION OF THE DRAWINGS

The above and other features, advantages, and aspects of embodiments of the present disclosure will become more apparent in combination with the accompanying drawings and with reference to the following detailed description. In the drawings, the same or similar reference numerals indicate the same or similar elements.

DETAILED DESCRIPTION

Figure 1:
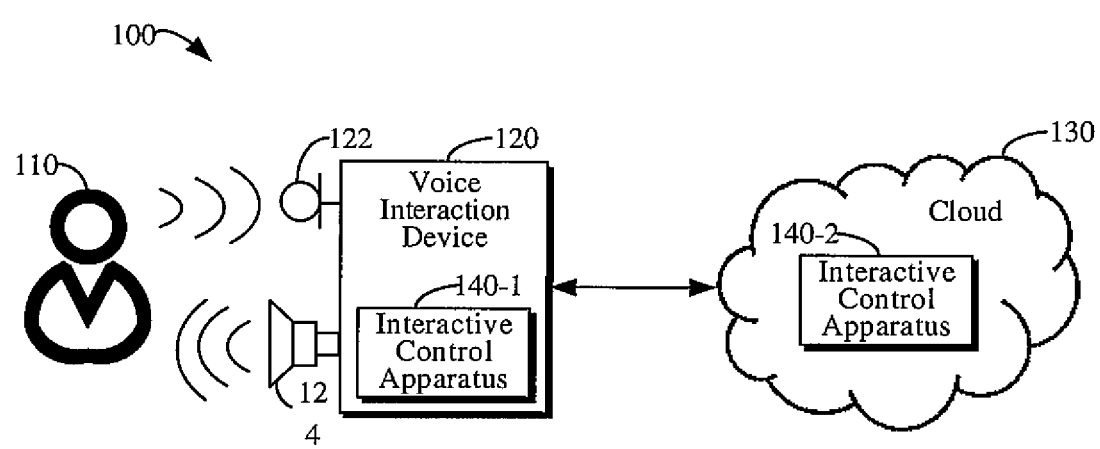
FIG. 1 is a schematic diagram of an environment in which embodiments of the present disclosure may be implemented.

Embodiments of the present disclosure will be described in more detail below with reference to the accompanying drawings. While certain embodiments of the present disclosure have been illustrated in the accompanying drawings, it is to be understood that the present disclosure may be embodied in various forms and should not be construed as being limited to the embodiments set forth herein. Instead, these embodiments are provided for a thorough and complete understanding of the present disclosure. It should be understood that the drawings and embodiments of the present disclosure are for illustrative purposes only and are not intended to limit the scope of the present disclosure.

In the description of the embodiments of the present disclosure, the term "include" and its equivalents should be construed as open-ended inclusions, i.e., "include, but is not limited to". The term "according to" is to be understood as "at least partially according to". The term "an embodiment" or "the embodiment" should be understood as "at least one embodiment". Terms "first", "second" and the like may refer to different or identical objects. Other explicit and implicit definitions may also be included below.

As mentioned above, during the voice interaction process, speech recognition is performed on collected sound signals so that corresponding information may be recognized from it for implementing interactive control. However, in some cases, some collected sound signals might not be a voice instruction for human-machine interaction, such that information recognized based on such sound signals may be erroneously applied for controlling a device.

Such a problem needs to be take into consideration especially in a process of one-wakeup-successive-interaction. This is because, in an interaction scheme of one-wakeup-one-interaction, a user needs to say a wake-up word first every time he/she desires to interact with a voice interaction device. Therefore, after the wake-up word is recognized and the device is waked up, the sound signal collected is highly likely a signal for human-machine interaction. However, when it comes to one-wakeup-successive-interaction, after the voice interaction device is waked up with the wake-up word, the user may produce speech sounds many times for interaction. Therefore, irrelevant environmental sounds may be collected during the interaction. It is desirable to identify and discriminate sounds for human-machine interaction and sounds for non-human-machine interaction accurately, thereby increasing the accuracy and intelligence of interactive voice-control, and improving the user experience of human-machine interaction.

Basic Operation Principle and Exemplary Environment

According to embodiments of the present disclosure, an improved solution for interactive voice-control is proposed. In this solution, an interaction confidence that a sound signal indicates speech for interaction with a voice interaction device is on the whole determined in terms of acoustic and semantic, based on a sound signal and/or recognized information that is recognized from the sound signal. Further, a matching status between the recognized information and the sound signal is also determined. The interaction confidence and matching status are provided for determining a response of the voice interaction device to the sound signal. In this manner, it may be determined from different dimensions whether the voice interaction device should respond to the acquired sound signal, and how to respond to the sound signal, so as to implement more accurate and intelligent interactive voice-control and to improve the user's experience.

Several embodiments of the present disclosure are described below in combination with the accompanying drawings.

FIG. 1 is a schematic diagram of an environment 100 in which embodiments of the present disclosure may be implemented. In the exemplary environment 100, a user 110 may send a voice instruction to a voice interaction device 120 to control operations of the voice interaction device 120. For example, in a case where the voice interaction device 120 is a smart speaker, the voice instruction may be "play the song XXX of the singer XXX", etc. After the sound signal is correctly recognized, the voice interaction device 120 may search for that song and play it for the user 110.

The voice interaction device 120 may have an associated sound collector 122 (e.g., one or more microphones) to collect voice instructions from the user 110. The voice interaction device 120 may also have an associated sound player 124 (e.g., one or more speakers) to play sounds for the user.

The voice interaction device 120 may be any electronic device that may be controlled and/or interacted with through sound signals. Some examples of the voice interaction device 120 may include, but are not limited to: a smart speaker, a voice interactive set-top box, a smart home appliance device, a voice tutor machine, a smart robot, a map navigation device, a smart wearable device, and the like. The voice interaction device 120 may also be any other electronic device installed with a voice interaction application, such as a voice assistant application, a smart vehicle system, an information search application, a map application, a social platform application, an audio and video playback application, a smart assistant application, and so on. Examples of the electronic device that may be installed with such voice interaction applications may be, but are not limited to, a smartphone, a multimedia computer, a multimedia tablet, an Internet node, a communicator, a desktop computer, a laptop computer, a notebook computer, a netbook computer, a tablet computer, a personal navigation device, a personal digital assistant (PDA), an audio/video player, a digital camera/camcorder, a positioning device, an e-book device, a game device, or any combination of the foregoing examples.

During the interaction with the voice interaction device 120, it is usually necessary to wake up the voice interaction device 120 with a wake-up word to enter an interaction state. The voice interaction device 120 may support one-wakeup-one-interaction or one-wakeup-successive-interaction. In the case of one-wakeup-one-interaction, after the user 110 wakes up the voice interaction device 120 with the wake-up word, the user 110 may perform one interaction with the voice interaction device 120, that is, to issue one voice instruction. In the case of one-wakeup-successive-interaction, after the voice interaction device 120 is waked up, the user 110 may directly interact with the voice interaction device 120 without saying the wake-up word again, as long as the device is in an operating state, such as being producing a sound, thereby simplifying the triggering of an interaction and encouraging the user to enjoy the interaction. In some cases, if the interaction belongs to a category of queries, such as a query about the weather, the user 110 may continue the interaction within a time period (for example, within 5 minutes) after the voice interaction device 120 has finished answering the query, without having to wake up the device again. In some cases, a larger one of a predetermined time period (for example, 5 minutes) after the wake-up and the operating time of the voice interaction device 120 may be selected for limiting the time during which the successive interaction may be available to the user.

The sound signal collected by the sound collector 122 of the voice interaction device 120 needs to be processed, so as to recognize an intention of the user from the sound signal. The processing on the sound signal and/or the determination for the intention of the user are/is performed locally at the voice interaction device 120, or remotely away from the voice interaction device 120. For example, the voice interaction device 120 may include an interactive control apparatus 140-1 configured to implement one or more aspects of the processing related to the sound signal locally, so as to control the interaction between the voice interaction device 120 and the user 110. The voice interaction device 120 may alternatively communicate with a remote processing device, for example, an interactive control apparatus 140-2 arranged in the cloud 130. The interactive control apparatus 140-2 may independently implement the processing of the sound signal collected by the voice interaction device 120 and the interactive control of the voice interaction device 120, or may cooperate with the interactive control apparatus 140-1 to implement the processing of the sound signal and the interactive control of the voice interaction device 120. Hereinafter, the interactive control apparatus 140-1 and the interactive control apparatus 140-2 are collectively or individually referred to as the interactive control apparatus 140.

It should be understood that the environment shown in FIG. 1 is merely exemplary. In some implementations, the interactive control apparatus 140-2 at the remote end may not be provided, or not be arranged in the cloud.

Exemplary Process

Figure 2:
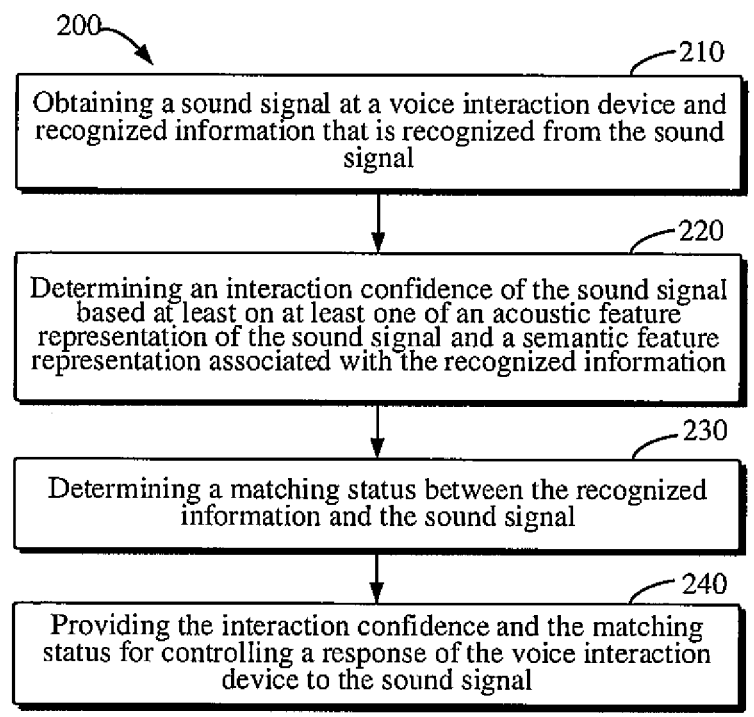
FIG. 2 is a flowchart of a process for interactive voice-control according to some embodiments of the present disclosure.

FIG. 2 is a flowchart of a process 200 for interactive voice-control according to some embodiments of the present disclosure. The process 200 may be implemented by the interactive control apparatus 140. For ease of discussion, the process 200 will be described with reference to FIG. 1.

At block 210, the interactive control apparatus 140 obtains a sound signal at the voice interaction device 120 and recognized information that is recognized from the sound signal. The recognized information may be recognized from the sound signal by means of speech recognition technologies. The recognized information may be represented in any form as necessary. In some embodiments, the recognized information may be text information. For example, the recognized information may include a sequence of texts in a certain natural language (e.g., Chinese, English, Japanese, etc.). In other embodiments, the recognized information may alternatively be represented in any other manner of information expression. For example, the recognized information may alternatively be expressed in a machine language.

The original sound collected by the voice interaction device 120 may be processed in a certain way to obtain a sound signal usable for speech recognition. The processing of an original sound signal and/or the recognition of information from the sound signal may be performed by the interactive control apparatus 140, or may be performed by other devices/devices other than the interactive control apparatus 140, and then provided to the interactive control apparatus 140. For example, in an embodiment in which the interactive control apparatus 140 is located at the remote end of the voice interaction device 120, for example, in the cloud, the original sound collected by the sound collector 122 may be processed in a certain way via a device at the local end of the voice interaction device 120 before being provided to the interactive control apparatus 140-2 at the remote end. In the following, some example embodiments related to how to obtain the sound signal and recognized information will be discussed in detail.

At block 220, the interactive control apparatus 140 determines an interaction confidence of the sound signal based at least on at least one of an acoustic feature representation of the sound signal and a semantic feature representation associated with the recognized information. The interaction confidence indicates the degree of reliability that the sound signal indicates or partially indicates speech for interaction with the voice interaction device 120.

In the process of interactive voice-control, it is desirable that the voice interaction device 120 responds to a real voice instruction of the user 110 timely and properly. However, the voice interaction device 120 may collect some noise signals or some signals that are not used for interaction with the voice interaction device 120 (e.g., conversations between people). For example, in a process of one-wakeup-successive-interaction, since the voice interaction device 120 monitors and collects voice instructions from the user 110 continuously after it is waked up, there may be a relatively high probability to collect some interference sound signals. If the voice interaction device 120 responds to the sounds that are not used for interaction with the voice interaction device 120, it may result in a bad impression of low intelligence in the interaction and a bad user experience. On the other hand, in a process of one-wakeup-one-interaction, although it may be simply assumed that in most cases the user 110 will issue a voice instruction every time the voice interaction device 120 is waked up, such an assumption would cause the voice interaction device 120 to be controlled to respond to the user regardless of whether the user 110 issues a voice instruction to the voice interaction device 120, which also results in a bad impression of low intelligence in the interaction with the voice interaction device 120 and a bad user experience.

Therefore, according to embodiments of the present disclosure, it is proposed to determine a confidence of the sound signal. Specifically, the interaction confidence may be determined from an overall perspective of the sound signal and/or the recognized information. The interaction confidence may indicate that the sound signal is real speech and the sound signal is used for interaction. Determining whether the sound signal belongs to real speech may avoid detecting a sound without speech, e.g. various environmental sounds as speech in a previous process and even recognizing information, such as a recognized text, from the sound without speech. Determining whether the sound signal is used for interaction is to discriminate whether the user 110 is interacting with the voice interaction device 120 or interacting with other people around.

The interaction confidence may be on the whole determined based at least on the acoustic feature representation of the sound signal and/or on the semantic feature representation of the recognized information. The acoustic feature representation facilitates to find out differences between speech and non-speech, and to discriminate between speech used for interaction and speech not used for interaction. The semantic feature representation of the recognized information may be determined in the semantic level, since information recognized from sound signals of non-speech is usually meaningless. Additionally, the interaction between a person and the voice interaction device 120 may be discriminated in terms of semantic. In some embodiments, the sound signal and the recognized information may be analyzed by means of a machine learning model, which will be discussed in detail below.

At block 230, the interactive control apparatus 140 determines a matching status between the recognized information and the sound signal. The matching status indicates the degree of the recognized information that reflects information actually contained in the sound signal. The interaction confidence may determine whether the sound signal is speech for interaction with the voice device 120 in terms of probability. However, when it is to determine how the voice interaction device 120 responds to the sound signal, it is usually necessary to understand the intention of the user based on the recognized information.

The recognized information may be expressed as a sequence of one or more units at different granularities. Here, each unit may be a word, a syllable, a grapheme, a phone, a sub-phone, or a combination thereof. The matching status of the recognized information and the sound signal may be used for recognizing whether the sound signal matches the recognized information on a one-to-one basis at a unit level of the recognized information. It also determines how to control the voice interaction device 120 to respond. In some embodiments, the machine learning model may also be used for determining the matching status of the recognized information and the sound signal, which will be discussed in detail below.

For example, if it is determined that the recognized information matches the sound signal on a one-to-one basis, the voice interaction device 120 may be controlled to respond immediately, that is, to give direct feedback to the sound signal. On the other hand, if it is determined that the recognized information does not match the sound signal on a one-to-one basis, it may be determined how to respond based on related strategies. For example, if the intention of the user may be properly determined from the recognized information now, the voice interaction device 120 may still be controlled to respond immediately, that is, to give the direct feedback to the sound signal. However, if the intention of the user could not be accurately determined from the recognized information, guiding feedback to the user 110 may be determined based on the matching status, so as to guide the user 110 to clarify a desired instruction to the voice interaction device 120.

At block 240, the interactive control apparatus 140 provides the interaction confidence and the matching status for controlling a response of the voice interaction device 120 to the sound signal. The control of the response of the voice interaction device 120 may be implemented locally by the interactive control apparatus 140, or by other interactive control apparatuses. Since the interaction confidence and the matching status are measured in terms of the determination of the interaction voice and the fine evaluation of the recognized information, the interactive control of the voice interaction device 120 may be improved, so that the voice interaction device 120 may respond to accurate interaction sound signals quickly, and not respond to non-interaction sound signals. In addition, in a case where a signal is an interaction sound signal but information is not accurately recognized therefrom, it is further determined how the voice interaction device 120 responds based on the matching status.

As a specific example, when the user 110 says "I want to listen to 'Rice Field' by Jay Chou", but the recognized information is "I want to listen to 'Ice Field' by Jay Chou", it may be determined based on the interaction confidence through the sound signal and/or recognized information that the user is interacting with the voice interaction device 120, but the matching confidence of "I want to listen to . . . by Jay Chou" in the recognized information is high, while the matching confidence of "Ice Field" is low. Under such a circumstance, the user 110 may be guided to further clarify his/her intention based on the matching status of the recognized information and the sound signal. For example, the voice interaction device 120 may be controlled to say "I didn't catch what you said. Which song of Jay Chou do you want to listen to?"

Exemplary Architecture of Apparatus

As mentioned above, the interactive control apparatus 140 may utilize the machine learning model to determine the interaction confidence and/or the matching status of the recognized information and the sound signal.

In the present disclosure, the term "machine learning model" may also be referred to as "learning model", "learning network", "network model", or "model". A "Neural network" or "neural network model" is a deep machine learning model. Generally speaking, the machine learning model receives input information and performs a prediction based on the input information.

Machine learning may be divided into three stages, namely a training stage, a testing stage and an application stage. In the training stage, a given machine learning model may be trained using a large number of training samples, and iterates continuously until the machine learning model may obtain consistent inferences from the training samples that are similar to the inferences that human intelligence may make. The machine learning model may be considered to be able to learn the mapping or association between inputs and outputs from training data through training. After training, a set of parameters of the machine learning model is determined. In the testing stage, test samples may be used to test the trained machine learning model to determine the performance of the machine learning model. In the application stage, the machine learning model may be used to process actually input information based on the set of parameters obtained by training to present a corresponding output. The machine learning model may be selected and configured based on different tasks and corresponding training data may be used to train the machine learning model to perform corresponding tasks.

Figure 3:
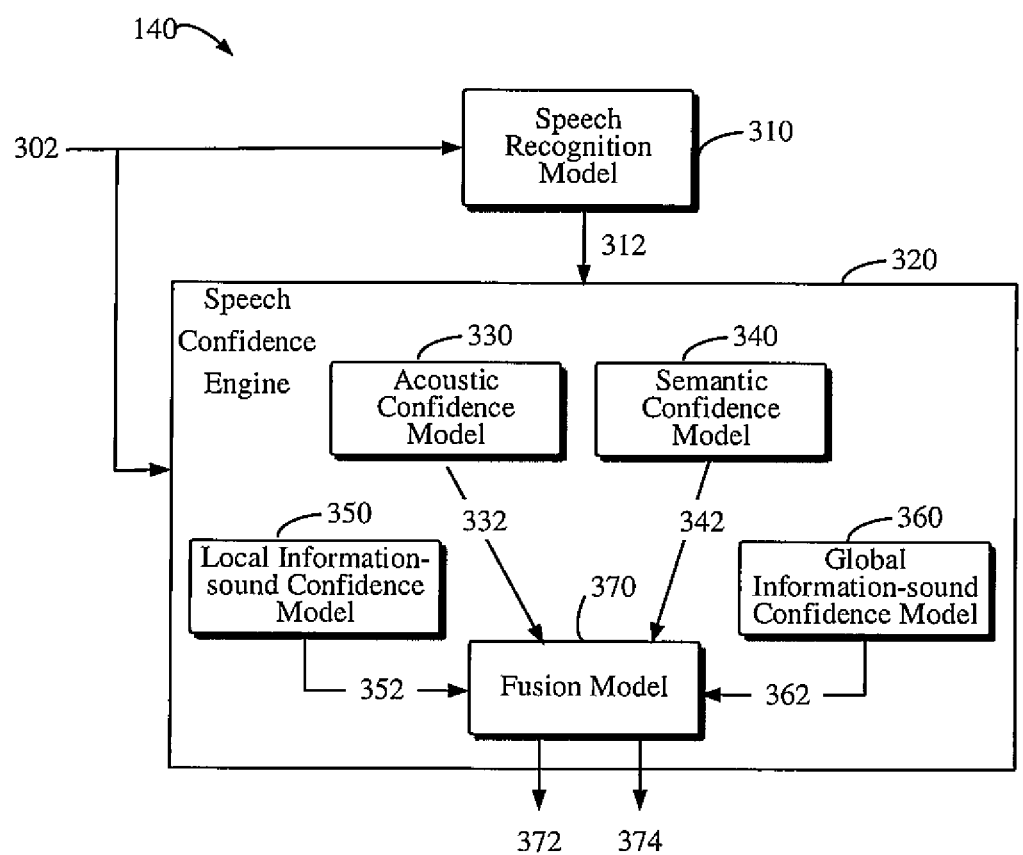
FIG. 3 is an example block diagram of an interactive control apparatus according to some embodiments of the present disclosure.

An example embodiment based on a machine learning model will now be described with reference to FIG. 3. FIG. 3 is an example architecture of the interactive control apparatus 140. As illustrated in FIG. 3, the interactive control apparatus 140 includes a speech recognition engine 310 and a speech confidence engine 320.

The speech recognition engine 310 is configured to obtain a sound signal 302 and determine corresponding recognized information 312 from the sound signal 302. The speech recognition engine 310 may utilize various speech recognition technologies to obtain the recognized information 312 from the sound signal 302. Embodiments of the present disclosure are not limited in this regard.

The speech confidence engine 320 is configured to determine the interaction confidence based on the sound signal 302 and/or the recognized information 312, and/or is configured to determine the matching status of the recognized information 312 and the sound signal 302. In the example embodiment of FIG. 3, the speech confidence engine 320 may utilize an acoustic confidence model 330 to process the sound signal 302 in order to determine or assist in determining the interaction confidence. Alternatively or additionally, the speech confidence engine 320 may also utilize a semantic confidence model 340 to process the recognized information 312 in order to determine or assist in determining the interaction confidence.

Regarding the determination of the matching status, the speech confidence engine 320 may use a local information-sound confidence model 350 to process the sound signal 302 and the recognized information 312, so as to determine or assist in determining the matching status of the information of the sound signal based on respective sound segments of the sound signal 302. Alternatively or additionally, the speech confidence engine 320 may use a global information-sound confidence model 360 to process the sound signal 302 and the recognized information 312, so as to determine or assist in determining the matching status of the recognized information and the sound signal from the sound signal 302 as a whole.

It may be seen that the above four models respectively process the sound signal 302 and/or the recognized information 312 from different aspects. In some embodiments, the acoustic confidence model 330 and/or the semantic confidence model 340 may output the acoustic confidence determined based on the sound signal 302 and/or the semantic confidence determined based on the recognized information 312, such that the acoustic confidence and the semantic confidence may be used alone or in combination to indicate that the sound signal 302 is the Interaction confidence of the voice used to interact with the voice interaction device 120. In some embodiments, the local information-sound confidence model 350 and the global information-sound confidence model 360 may output the matching status determined based on sound segments and/or the matching status determined from the sound signal 302 as a whole, such that the matching status determined based on the sound segments and/or the matching status determined from the sound signal 302 as a whole may be used alone or in combination to indicate the degree to which words included in the recognized information 312 correctly reflect information actually included in the sound signal 302. In some embodiments, the acoustic confidence model 330, the semantic confidence model 340, the local information-sound confidence model 350 and/or the global information-sound confidence model 360 may provide intermediate results of model processing and/or final outputs 332, 342, 352, and 362 to the fusion model 370. Since the four models 330, 340, 350, and 360 all parse the sound signal 302 and/or the recognized information 312 from different aspects based on their respective tasks, the interaction confidence 372 and/or matching status 374 may be determined more accurately after the fusion model 370 aggregates the above information.

Hereinafter, these models involved in the speech confidence engine 320 will be described in more detail.

Exemplary Embodiment of Acoustic Confidence Model

The acoustic confidence model 330 is configured to determine a probability that a sound signal indicates speech for human-machine interaction (referred to as the acoustic confidence), that is, to determine the probability that the sound signal is real speech or speech of interaction between a human and a voice interaction device. An input to the acoustic confidence model 330 is a sound signal. The acoustic confidence model 330 may be configured to extract the acoustic feature representation of the sound signal, and to determine the acoustic confidence that the sound signal indicates speech for human-machine interaction, based on the acoustic feature representation.

The acoustic confidence model 330 may be implemented using any machine learning model suitable for processing sound signals, especially a machine learning model suitable for processing information on a time series. In some embodiments, the acoustic confidence model 330 may be realized based on one or more types of model structures such as a convolutional neural network (CNN), a recurrent neural network (such as a simple RNN, a LSTM network, a GRU network, etc.), a transformer network, and so on.

Figure 4:
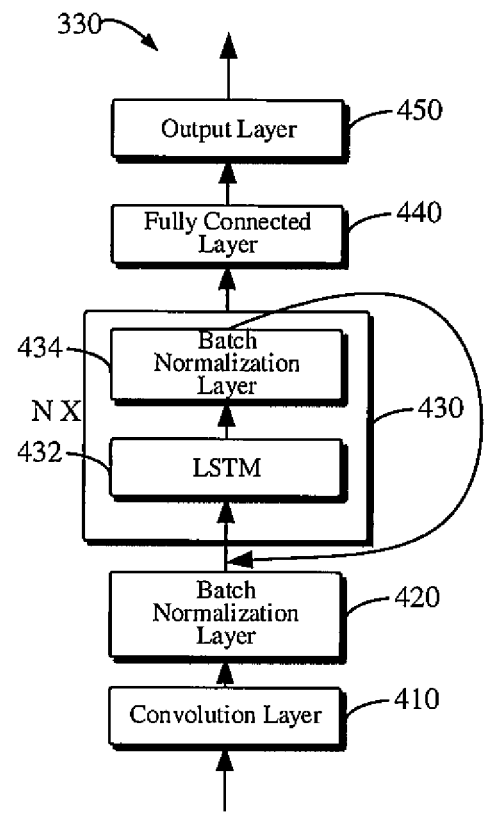
FIG. 4 is an example block diagram of an acoustic confidence model according to some embodiments of the present disclosure.

FIG. 4 is an example model structure of the acoustic confidence model 330. In this example, the acoustic confidence model 330 is established as a deep neural network model, which may include different network layers. As illustrated in FIG. 4, the acoustic confidence model 330 includes a convolution layer 410, a batch normalization (BN) layer 420, N transformation layers 430 (where N is an integer greater than or equal to 1), a fully connected (FC) layer 440 and an output layer 450. Each transformation layer 430 may include one or more LSTM sub-networks 432 and a batch normalization layer 434. In the acoustic confidence model 330, network layers before the fully connected layer 440 and the output layer 450 may be regarded as network layers for exploring the acoustic feature representation of the input sound signal. Each LSTM sub-network 432 may pan on the sound signal in a fixed time window and process input information based on the time window. The output layer 450 uses a transformation function to generate a model output, that is, the acoustic confidence, based on the acoustic feature representation provided by the previous layer. In some examples, the value of the acoustic confidence may be continuously chosen from a range of 0 to 1. Therefore, the function used by the output layer 450 may be, for example, a sigmoid function to map the output value to the range of 0 to 1.

It should be understood that FIG. 4 is only an example of the acoustic confidence model 330. The acoustic confidence model 330 may also be designed to include more network layers of the same or different types, or fewer network layers, or one or more of the network layers of the acoustic confidence model 330 may be replaced by another one or more network layers. Embodiments of the present disclosure are not limited in this regard.

The training of the acoustic confidence model 330 may be based on a supervised machine learning method. Considering the task to be performed by the acoustic confidence model 330, during the training stage, training data used to train the acoustic confidence model 330 includes a sound signal and an acoustic confidence label corresponding to the sound signal. The acoustic confidence label indicates whether a corresponding sound signal is speech for human-machine interaction. The training data usually includes a positive sample and a negative sample. In the task of the acoustic confidence model 330, the positive sample (sometimes referred to as a first positive sample in the present disclosure for distinction) includes a sound signal for human-machine interaction; and the negative sample (sometimes referred to as a first negative sample in the present disclosure for distinction) includes a sound signal for non-human-machine interaction (such as noise, sounds of communication among people, animal sounds, etc.). The acoustic confidence label corresponding to a positive sample indicates that a corresponding sound signal is speech for human-machine interaction, and the acoustic confidence label corresponding to a negative sample indicates that a corresponding sound signal is not speech for human-machine interaction.

During the collection of training samples, a sound signal collected before and a sound signal collected after the wake-up word detected by the voice interaction device (for example, the semantic interaction device 120 and/or other voice interaction devices) may be used as a negative sample and a positive sample, respectively. In some embodiments, a sound signal before and a sound signal after the wake-up word collected by the voice interaction device used in the case of one-wakeup-one-interaction may also be used as a negative sample and a positive sample, respectively. Of course, any other method of sample collection is also feasible.

In the training process, each frame in a sound signal of a sample may be labeled as a positive example or a negative example (i.e., having an acoustic confidence label corresponding to the positive sample and an acoustic confidence label corresponding to the negative sample). Therefore, during training of the model, each frame of an input sample sound signal may be used to be compared with the corresponding acoustic confidence label, and to optimize parameters of the model based on errors obtained from the comparison. For example, during training, the acoustic feature representation of each frame of the input sample sound signal after being processed by the N transform layers 430 is provided to the subsequent fully connected layer 440.

Since a positive sample used to train the acoustic confidence model 330 is a sound signal for human-machine interaction and a negative sample is a sound signal for a non-human machine interaction, the acoustic confidence model 330 will be trained to be able to accurately distinguish sound signals for human-machine interaction and non-human-machine interaction. After training, the acoustic confidence model 330 may be applied to process the sound signal 302 of the voice interaction device 102. In the application stage, the N transformation layers 430 may provide the acoustic feature representation extracted from the last frame of the sound signal 302 for the subsequent fully connected layer 440.

As mentioned above, when processing the sound signal 302, the acoustic confidence output by the acoustic confidence model 330 may be configured to directly determine the interaction confidence, or to determine the interaction confidence together with the semantic confidence output by the semantic confidence model 340. Alternatively, the acoustic confidence output by the acoustic confidence model 330 and/or the acoustic feature representation extracted from the sound signal 302 may be provided as the output 332 to the fusion model 370 in the speech confidence engine 320. The output 332 may be combined with model outputs and/feature representations from other models by the fusion model 370 to determine the final interaction confidence 372. When the acoustic feature representation is provided to the fusion model 370, the acoustic feature representation after the processing of the N transformation layers 430 of the acoustic confidence model 330 may be provided to the fusion model 370. In embodiments where it is unnecessary to provide the final acoustic confidence to the fusion model 370 for determining the interaction confidence 372, the fully connected layer 440 and the output layer 450 of the acoustic confidence model 330 may not be used to process the acoustic feature representation of the sound signal 302 in the application stage after the training stage.

Exemplary Embodiment of Semantic Confidence Model

The semantic confidence model 340 is configured to semantically determine a probability (referred to as the semantic confidence) that the recognized information is information recognized from the speech used for human-machine interaction, that is, to determine a probability that the recognized information is information recognized from the real speech of interaction between a human and a voice interaction device or a probability that the recognized information is information recognized from the sound for non-human-machine interaction. The input to the semantic confidence model 340 is the recognized information. The semantic confidence model 340 may be configured to obtain the semantic feature representation associated with the recognized information, and to determine the semantic confidence of the recognized information being speech for human-machine interaction based on the semantic feature representation.

The semantic confidence model 340 may be implemented using any machine learning model suitable for processing semantics. When the recognized information is expressed as text information, for example, a sequence of texts represented by a natural language, the semantic confidence model 340 may be implemented using a machine learning model suitable for natural language processing (NLP). In some embodiments, the semantic confidence model 340 may be implemented based on one or more types of model structures such as a convolutional neural network (CNN), a recurrent neural network (such as a simple RNN, a LSTM network, a GRU network, etc.), a transformer network, and so on. In some embodiments, the semantic confidence model 340 may directly determine whether the recognized information is information recognized from speech of human-machine interaction from an overall point of view by using semantic feature representations such as interaction context, decoded word graph information, user behavior feedback, and semantic information of a recognition result.

Figure 5:
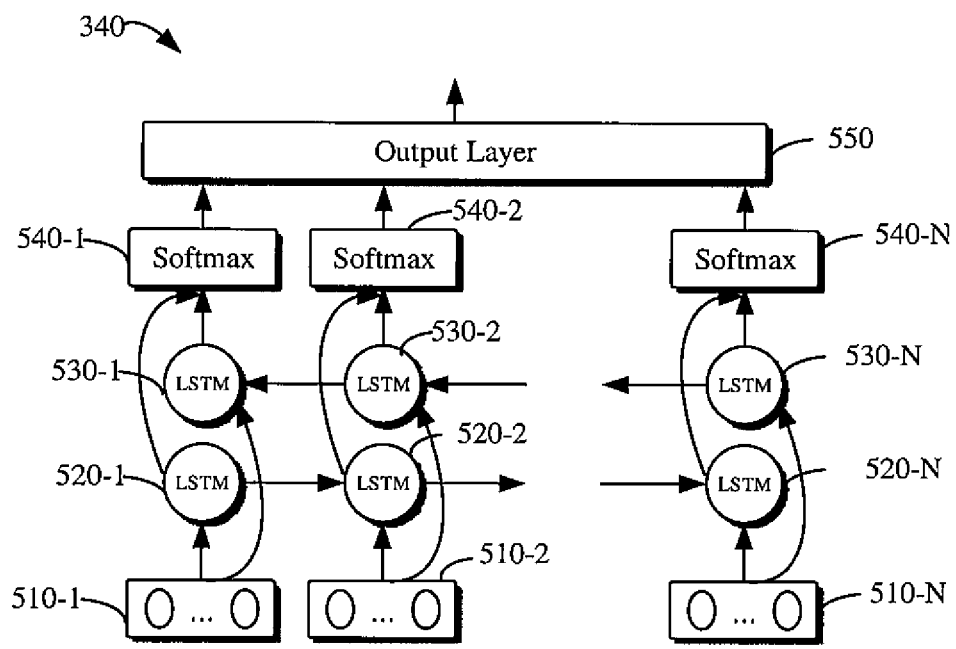
FIG. 5 is an example block diagram of a semantic confidence model according to some embodiments of the present disclosure.

FIG. 5 is an example model structure of the semantic confidence model 340. In this example, the semantic confidence model 340 is established as a deep neural network model, and is based on a bidirectional LSTM (BiLSTM) model structure. In some embodiments, features of the recognized information may be converted and referred to as embedding representations. Such a conversion function may be incorporated in the semantic confidence model 340, or provided to the semantic confidence model 340 after being executed by an external model. In some embodiments, if the recognized information is expressed by a text, word segmentation may be performed on the recognized information (such as a text in a language such as Chinese, Japanese, Korean, etc.), and then the embedding representations obtained after the word segmentation may be used as inputs to the model. Of course, in some embodiments, the recognized information may not be segmented.

As illustrated in FIG. 5, embedded representations 510-1, 510-2, . . . , 510-N (collectively referred to as embedded representations 510, where N is a positive integer greater than or equal to 1) corresponding to the recognized information respectively are processed by one or more LSTMs. In the example of FIG. 5, two layers of LSTM are shown, for example, a layer including LSTM 520-1, 520-2, . . . , 520-N (collectively referred to as LSTM 520) and a layer including LSTM 530-1, 530-2, . . . , 530-N (collectively referred to as LSTM 530). It should be understood that either more layers of LSTM or only one layer of LSTM is also feasible. The output of each LSTM of the last layer is respectively provided to Softmax layer 540-1, 540-2, . . . , 540-N (collectively referred to as Softmax layer 540). The Softmax layer 540 may process inputs to this layer based on the Softmax function. The final output layer 550 of the semantic confidence model 340 may output the semantic confidence of the recognized information being information recognized from speech for human-machine interaction.

It should be understood that FIG. 5 is only an example of the semantic confidence model 340. The semantic confidence model 340 may also be designed to include more network layers of the same or different types, or fewer network layers; or one or more of the network layers of the semantic confidence model 340 may be replaced by another one or more network layers. Embodiments of the present disclosure are not limited in this regard.

Although FIG. 5 shows a bidirectional semantic confidence model 340 (for example, using the Bi-LSTM), in reality, the model may be a unidirectional model or a bidirectional model as machine learning models based on semantic feature representation are generally small in size.

The semantic feature representations that may be taken into consideration for the semantic confidence model 340 to determine the semantic confidence are mentioned above. In some embodiments, the semantic feature representation of the semantic confidence model 340 may include the interaction context. The interaction context, which may refer to information (such as a text input by voice) provided by a person and information (such as a text output by voice) corresponding to a response of the voice interaction device during the interaction between the person and the voice interaction device, include all interaction information in the recognized information from the beginning of this round of wakeup to the current interaction. The semantic feature representation may also consider the decoded word graph information. The currently input recognized information may be decoded from a word graph. The semantic confidence model 340 may use an acoustic score, a language score, and a total score in the word graph, and also include a list of candidate words for each word in the recognized information.

Alternatively or additionally, the semantic confidence model 340 may also consider semantic features of the recognized information. The semantic features mainly cover domain parsing, intention determination, completeness determination and information of other dimensions. Alternatively or additionally, the semantic confidence model 340 may also consider personalized user information, which represents user registration and personalized user information formed after many times of interactions, including age, gender, and lists of high-frequency on-demand resources, lists of areas of interest, etc. Alternatively or additionally, the semantic confidence model 340 may also consider behavior feedback information during the interaction of the user with the voice interaction device. The behavior feedback information may include behaviors of the user, such as resource switching, instruction information, listening duration, and the like.

The training of the semantic confidence model 340 may be based on a supervised machine learning method. Considering the task to be performed by the semantic confidence model 340, during the training stage, training data used to train the semantic confidence model 340 includes recognized information and an acoustic confidence label corresponding to the recognized information. The training data usually includes a positive sample and a negative sample. In the task of the semantic confidence model 340, the positive sample (sometimes referred to as a second positive sample in the present disclosure for distinction) includes correct information (e.g., a labeled correct text) labeled from the sound signal for human-machine interaction; and the negative sample (sometimes referred to as a second negative sample in the present disclosure for distinction) includes information for non-human-machine interaction. The semantic confidence label corresponding to a positive sample indicates that corresponding information is information recognized from speech for human-machine interaction, and the semantic confidence label corresponding to a negative sample indicates that corresponding information is not information recognized from speech for human-machine interaction. Since the positive sample used to train the semantic confidence model 340 is related to sound signals for human-machine interaction, and the negative sample is related to sound signals for non-human-machine interaction, the semantic confidence model 340 will be trained to be able to accurately distinguish information corresponding to a sound signal for human-machine interaction from information corresponding to a sound signal for non-human-machine interaction.

During the collection of training samples, corresponding information may be labeled out from the positive sample and the negative sample used to train the acoustic confidence model 330 to be used as the positive sample and the negative sample of the semantic confidence model 340, respectively. The negative sample may also obtain information not for human-machine interaction from other information carriers (such as web pages, articles, etc.). Of course, any other manner of sample collection is also feasible.

As mentioned above, when processing the recognized information 312, the semantic confidence output by the semantic confidence model 340 may be used to directly determine the interaction confidence, or to determine the interaction confidence together with the semantic confidence output by the semantic confidence model 340. Alternatively, the semantic confidence output by the semantic confidence model 340 and/or the semantic feature representation associated with the recognized information 312 may be provided as the output 342 to the fusion model 370 in the speech confidence engine 320. The output 342 may be combined with model outputs and/or feature representations from other models by the fusion model 370 to determine the final interaction confidence 372. When the semantic feature representation is provided to the fusion model 370, the feature representation obtained by feature engineering may be directly used without the semantic confidence model 340 performing too much processing.

Exemplary Embodiment of Local Information-Sound Confidence Model

As mentioned above, the recognized information may be represented as a sequence of units, which includes one or more units. Each unit may have any of the following: a word, a syllable, a grapheme (for example, in Chinese a grapheme refers to a single character, and in English a grapheme refers to a letter that makes up a word), a phone, a sub-phone, a segment of a polyphone combination, or a segment of a multi-grapheme combination. In some embodiments, one or more units in the sequence of units converted from the recognized information may further include a context-sensitive unit that, is related to the context of a unit (for example, a word, a syllable, a grapheme, a phone, a sub-phone, a segment of a polyphone combination, and a segment of a multi-grapheme combination) directly converted from the recognition unit, which helps to distinguish the context of each unit. For example, for the recognition text "my motherland", it may be expressed as "w o d e z u g u o" after being converted into a sequence of phones. A context-sensitive combination may be added to the sequence of phones, such that the sequence of phones may be converted into "^_w+o, w_o+d, o_d+e . . . " and so on. Here, the context-sensitive combination is used to distinguish the same phone in different contexts.

The local information-sound confidence model 350 is configured to determine, based on the acoustic segment of the sound signal, the probability (also referred to as the matching confidence) that each unit constituting the recognized information is accurately recognized.

In detail, after converting the recognized information into a sequence of units, the sound signal may be divided into one or more acoustic segments respectively corresponding to one or more units in the sequence of units. Each unit is sequentially aligned with each acoustic segment to form at least one unit-acoustic segment pair. When dividing the sound signal, a mute part in the sound signal may be deleted first, and then the other parts may be fused and divided. The number of divided acoustic segments is the same as the number of units in the sequence of units.

Each unit-acoustic segment pair is used as an input to the local information-sound confidence model 350. The local information-sound confidence model 350 may be configured to extract a unit-acoustic segment feature representation of each unit-acoustic segment pair, and to determine a matching confidence of a corresponding unit and acoustic segment based on the extracted at least one unit-acoustic segment feature representation. The value of the matching confidence may be a discrete value, for example, 0 or 1, where 0 indicates that the unit does not match the acoustic segment, and 1 indicates that the unit matches the acoustic segment. In other examples, the value of the matching confidence may be chosen continuously, for example, between 0 and 1, to indicate the probability of matching or non-matching.

In some embodiments, the alignment of the acoustic segment and the unit may be implemented using an alignment model. The alignment model may be a three-state alignment model based on a hidden Markov model (HMM). The acoustic model used for alignment is made up of a convolutional neural network and a fully connected neural network. The local information-sound confidence model 350 may be implemented using any machine learning model suitable for processing sound signals and semantics of information. In some embodiments, the local information-sound confidence model 350 may be implemented based on a multi-layer CNN model structure. Examples of typical model structures may include a computer visual geometry group (VGG), an Inception network, a residual network, and so on.

Figure 6:
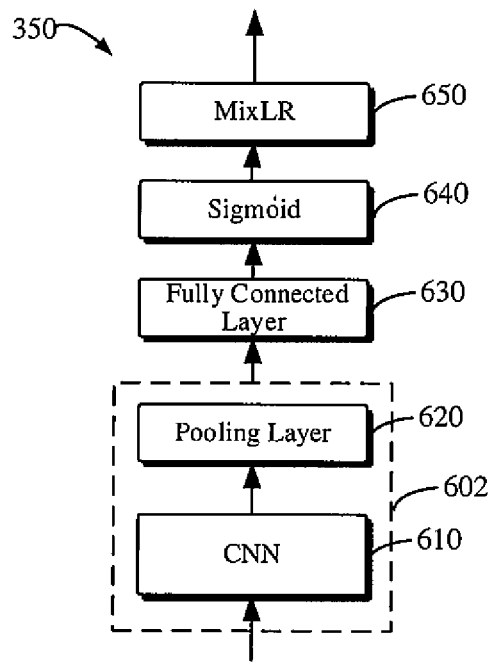
FIG. 6 is an example block diagram of a local information-sound confidence model according to some embodiments of the present disclosure.

FIG. 6 is an example structure of the local information-sound confidence model 350. In the example of FIG. 6, the local information-sound confidence model 350 is a mixture of logistic regression (MixLR) model based on a shared-hidden layer VGG. As shown in the figure, the local information-sound confidence model 350 includes one or more cascaded CNN structures 602. Each CNN structure 602 includes one or more CNN network layers 610 and a pooling layer 620. When there are more than one CNN structures 602, different CNN structures 602 are connected in series and the pooling layer 620 may continuously reduce a size of an intermediate feature representation passed from the previous CNN structure 602 to the CNN structure 602. After the entire CNN structure 602 is processed, the local information-sound confidence model 350 includes a fully connected layer 630, a Sigmoid layer 640, and a MixLR model 650. The MixLR model 650 gives the output of the local information-sound confidence model 350.

It should be understood that FIG. 6 is only one example of the local information-sound confidence model 350. The local information-sound confidence model 350 may also be designed to include more network layers of the same or different types, or fewer network layers; or one or more network layers of the local information-sound confidence model 350 may be replaced by another one or more network layers. Embodiments of the present disclosure are not limited in this regard.

The training of the local information-sound confidence model 350 may be based on a supervised machine learning method. Considering the task to be performed by the local information-sound confidence model 350, during the training stage, training data used to train the local information-sound confidence model 350 includes at least one acoustic segment in the sound signal, at least one unit, and at least one label (indicating a matching degree of the at least one unit and the at least one acoustic segment) corresponding to the at least one acoustic segment and the at least one unit. The training data usually includes a positive sample and a negative sample. The positive sample (sometimes referred to herein as a third positive sample for distinction) includes an acoustic segment (sometimes referred to as a first acoustic segment for distinction) of the sound signal used for human-machine interaction, a unit labeled in the first acoustic segment (sometimes referred to as a first unit for distinction), and a label corresponding to the first acoustic segment and the first unit (indicating a matching degree of the unit and the acoustic segment). The negative sample (sometimes referred to herein as a third negative sample for distinction) includes a certain acoustic segment (sometimes referred to as a second acoustic segment for distinction) and a unit different from a unit present in the second acoustic segment (sometimes referred to as a second unit for distinction). In some embodiments, the third negative sample may further include an acoustic segment in a sound signal of human-machine interaction and/or a sound signal of non-human-machine interaction and a unit that does not match the acoustic segment.

When determining the positive sample and the negative sample of the local information-sound confidence model 350, a positive and negative sample definition method based on the confusion matrix may also be adopted. In the two types of confirmation problems of the local information-sound confidence model 350, definitions of the positive and negative examples are important. In some embodiments, the process of defining the positive and negative examples may also require an optimization method based on a loss function. In some embodiments, the confusion matrix formed by Viterbi alignment may be used as a reference for positive and negative samples, and the first few similar predictions in the confusion matrix (such as the first K, where K is greater than or equal to 1) are not used as negative samples of the acoustic segment, and the rest are used as negative samples of the acoustic segment. In this process, a loss function based on focal loss is used.

During the collection of training samples, a unit in corresponding recognized information and an acoustic segment corresponding to the unit may be recognized from the positive sample and negative sample used to train the semantic confidence model 340. The unit and the acoustic segment are used as the positive sample and negative sample of the local information-sound confidence model 350, respectively. It is also possible to randomly modify a unit corresponding to the acoustic segment into another unit to serve as another negative sample. Of course, any other method of sample collection is also feasible.

As mentioned above, when processing the recognized information 312 and the sound signal 302, the matching confidence corresponding to each unit output by the local information-sound confidence model 350 may be used as the matching status of information and voice, or may be used to determine the matching status together with the outputs of the global information-sound confidence model 360. Alternatively, the matching confidence at the unit level of the recognized information output by the local information-sound confidence model 350 and/or each unit-acoustic segment feature representation may be provided to the fusion model 370 in the speech confidence engine 320. The fusion model 370 is configured to determine the final matching status 374 by combining model outputs and/or feature representations from other models with the matching confidence at the unit level of the recognized information output by the local information-sound confidence model 350 and/or each unit-acoustic segment feature representation.

Exemplary Embodiment of Global Information-Sound Confidence Model

Compared with the local information-sound confidence model 350, the global information-sound confidence model 360 is configured to determine from the sound signal as a whole the situation in which each unit in the recognized information is accurately recognized, and to determine a type of a specific error and a location of a possible error when the recognized information is not accurately recognized on the whole.

The global information-sound confidence model 360 may be configured to output a sequence of labels. The sequence of labels includes matching labels corresponding to respective units in the sequence of units, a start label and an end label. Each of the matching labels indicates whether each unit in the sequence of units matches a corresponding acoustic segment in the sound signal. The start label indicates whether a start unit in the sequence of units is present at a start position of the sound signal. The end label indicates whether a last unit in the sequence of units is present at an end position of the sound signal. If the sequence of units corresponding to the recognized information includes more than one unit, the sequence of labels may further include a corresponding adjacency indicating label between matching labels of two adjacent units in the more than one unit. Each adjacency indicating label indicates whether two adjacent units are present at adjacent positions in the sound signal.

In some embodiments, the global information-sound confidence model 360 may adopt a classic encoder-decoder architecture in a neural network structure, where the encoder architecture may be shared with the acoustic confidence model 330. Of course, the global information-sound confidence model 360 may also adopt a completely independent encoder-decoder architecture. In the encoder-decoder architecture, an attention architecture and the like may be utilized. In some embodiments, the encoder architecture may be implemented based on one or more types of model structures such as a CNN, a recurrent neural network (a simple RNN, a LSTM, a GRU, etc.), a transformer network, and so on. The attention architecture may include an attention mechanism based on summation operations, a self-attention mechanism, a dot-product attention mechanism, a local attention mechanism, etc. The decoder architecture is similar to the encoder architecture, and may be implemented based on one or more types of model structures such as a CNN, a recurrent neural network (a simple RNN, a LSTM, a GRU, etc.), a transformer network, and so on.

Figure 7:
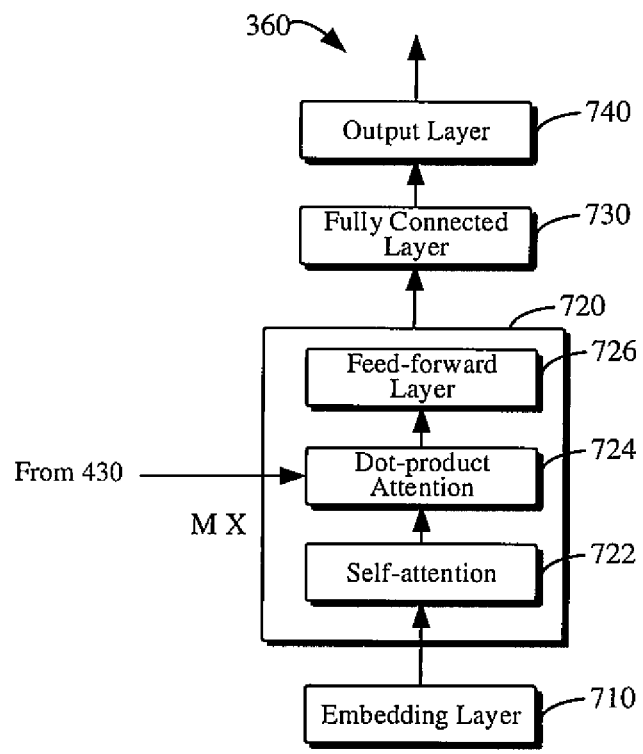
FIG. 7 is an example block diagram of a global information-sound confidence model according to some embodiments of the present disclosure.

FIG. 7 is an example model structure of the global information-sound confidence model 360. In this example, the encoder architecture of the global information-sound confidence model 360 is shared with the acoustic confidence model 330. That is, the sound signal is processed by the acoustic confidence model 330 to provide the acoustic feature representation (e.g., from the final transformation layer 430 of the acoustic confidence model 330). An embedding layer 710 of the global information-sound confidence model 360 extracts the semantic feature representation of the recognized information. The global information-sound confidence model 360 also includes an attention architecture 720 including a self-attention portion 722, a dot-product attention portion 724, and a feed-forward layer 726. The global information-sound confidence model 360 also includes a fully connected layer 730 and an output layer 740 for providing the final sequence of labels. The global information-sound confidence model 360 is configured to predict the sequence of labels following an order of each unit in the recognized information. In the process of unit-by-unit processing, the global information-sound confidence model 360 may extract a global acoustic semantic feature representation based on the acoustic feature representation and the semantic feature representation, and finally generate the sequence of labels.

In order to better understand such a sequence of labels, several examples of FIG. 8 will be described in detail to describe how the sequence of labels helps not only to give identification accuracy determination of a single unit, but also to determine a type of error occurred when there is no unit-by-unit matching in the recognized information. Generally, common recognition errors may be categorized as: a deletion error, that is, one or more units are lost; an insertion error, that is, one or more additional units are inserted into the recognized information; and a replacement error, that is, one or more units in the recognized information are replaced with other units. One or more types of errors mentioned above may appear in specific recognized information.

Figure 8:
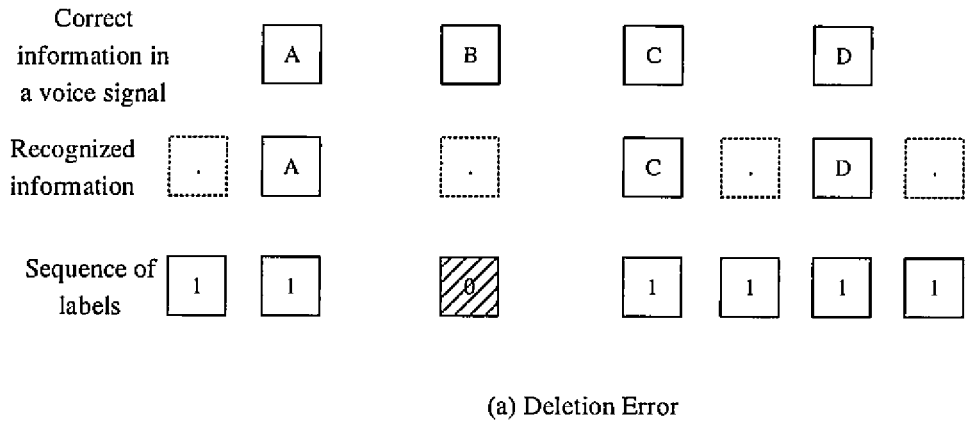
FIG. 8 is a schematic diagram of an example of generating a sequence of labels according to some embodiments of the present disclosure.
Figure 8:
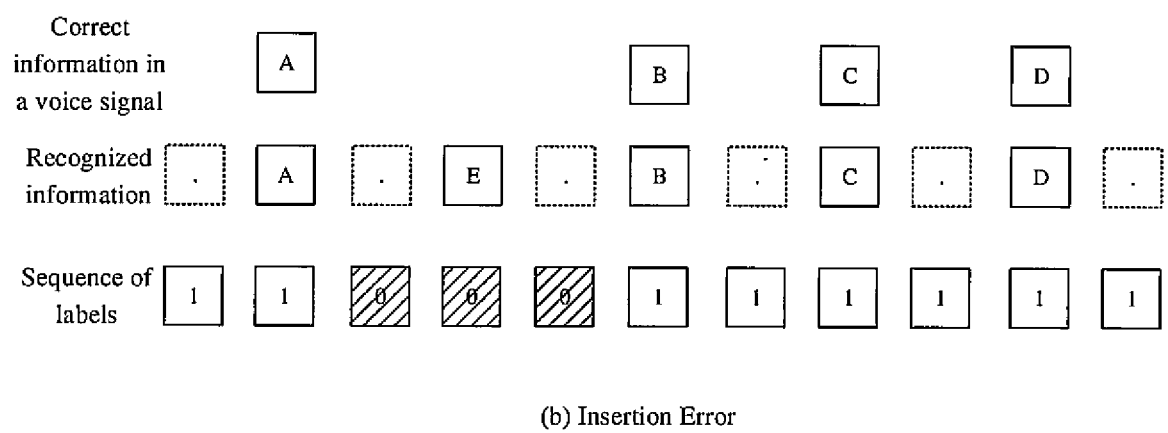
Figure 8:
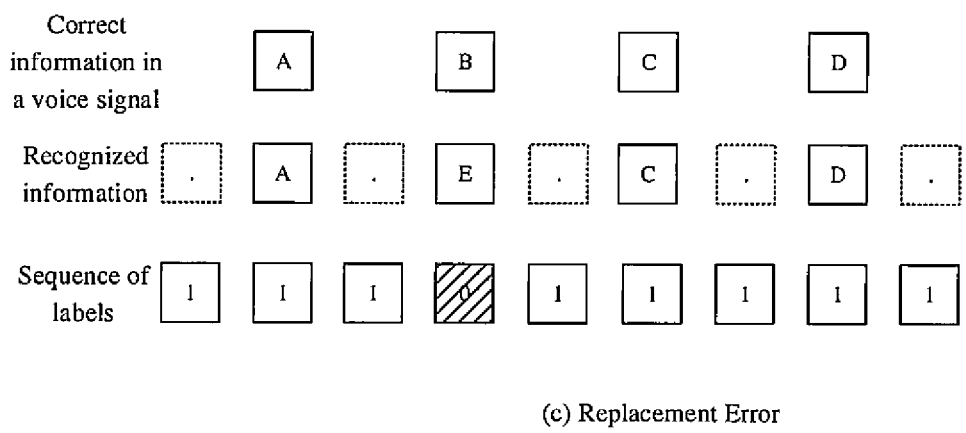

In example (a) of FIG. 8, it is assumed that correct information in the sound signal is "ABCD", but the recognized information is recognized as "ACD". The global information-sound confidence model 360 adds a start label bit and an end label bit before and after the recognized information on the basis of the recognized information, and adds adjacency label bits between two adjacent units in the recognized information. The global information-sound confidence model 360 is used to determine a value of each label bit and a value of a matching label corresponding to each unit. For example, in order, the global information-sound confidence model 360 determines from the sound signal as a whole that the unit "A" in the recognized information appears at the beginning of the sound signal, and the unit "A" also matches the sound segment in the sound signal. Therefore, the start label in the sequence of labels is labeled as "1", which is used to indicate the start position, and the matching label corresponding to the unit "A" is also labeled as "1", which is used to indicate unit matching.

Further, the global information-sound confidence model 360 finds that the two adjacent units "A" and "C" in the recognized information are not adjacent in the sound signal, because the sound signal shows that there should be a unit, that is, unit "B" between the two units. Therefore, the adjacency label between the two adjacent units "A" and "C" is labeled as "0", indicating that the two adjacent units are not present at adjacent positions in the sound signal. The global information-sound confidence model 360 continues to determine the matching and a position relation of units "C" and "D", and to determine the end label after the end unit "D". The global information-sound confidence model 360 may generate a sequence of labels for the recognized information "ACD": 1 1 0 1 1 1 1. Through the sequence of labels, it may be determined that one or more units have been lost between the units "A" and "C", and thus it may be determined that a "deletion error" has occurred in the recognized information.

In example (b) of FIG. 8, it is assumed that correct information in the sound signal is "ABCD", but the recognized information is recognized as "AEBCD". The global information-sound confidence model 360 adds a start label bit and an end label bit before and after the recognized information on the basis of the recognized information, and adds adjacency label bits between two adjacent units in the recognized information. By determining a value of each label bit in order, the global information-sound confidence model 360 may generate a sequence of labels for the recognized information "AEBCD": 1 1 0 0 0 1 1 1 1 1 1 1. Through the sequence of labels, it may be determined that unit "E" between unit "A" and unit "B" in the recognized information "AEBCD" is inserted by mistake, so that it may be determined that an "insertion error" occurs in the recognized information.

In example (c) of FIG. 8, it is assumed that correct information in the sound signal is "ABCD", but the recognized information is recognized as "AECD". The global information-sound confidence model 360 adds a start label bit and an end label bit before and after the recognized information on the basis of the recognized information, and adds adjacency label bits between two adjacent units in the recognized information. By determining a value of each label bit in order, the global information-sound confidence model 360 may generate a sequence of labels for the recognized information "AECD": 1 1 1 0 1 1 1 1 1. Through the sequence of labels, it may be determined that unit "E" between unit "A" and "C" is erroneously recognized, and there should be another unit there, and thus it may be determined that a "replacement error" occurs in the recognized information.

The training of the global information-sound confidence model 360 may be based on a supervised machine learning method. Considering the task to be implemented by the global information-sound confidence model 360, in the training stage, the training data used to train the global information-sound confidence model 360 includes the sound signal, the recognized information, and the sequence of labels generated for the sound signal and recognized information. The training data usually includes a positive sample and a negative sample.

In the task of the global information-sound confidence model 360, the positive sample (sometimes referred to herein as a fourth positive sample for distinction) includes a first sound signal used for human-machine interaction, first information labeled from the first sound signal, and a correct sequence of labels generated with respect to the first information and the first sound signal. The negative sample (sometimes referred to herein as a fourth negative sample for distinction) may be another training sample (i.e., a combination of another sound signal, another piece of information, and another sequence of labels) other than the fourth positive sample. The negative sample may include a second sound signal, second information, and a wrong sequence of labels generated with respect to the second information or the second sound signal. In detail, the second sound signal may be voice used for human-machine interaction and/or voice not used for human-machine interaction. The second information may be wrong information recognized from the second sound signal, thereby causing a wrong sequence of labels to be generated. Or the second information may be correct information recognized from the second sound signal, but the sequence of labels generated is wrong.

During the collection of training samples, the positive and negative samples used to train the acoustic confidence model 330 may be used to recognize corresponding information so as to construct the positive and negative samples of the global information-sound confidence model 360. Of course, any other method of sample collection is also feasible.

As mentioned above, when processing the recognized information 312 and the sound signal 302, the sequence of labels output by the global information-sound confidence model 360 may be used as a matching status, or may be used to determine the matching status together with the output of the local information-sound confidence model 350. Alternatively, the sequence of labels output by the global information-sound confidence model 360 and/or the global acoustic semantic feature representation extracted relative to an end unit in several units may be provided to the fusion model 370 in the speech confidence engine 320. The fusion model 370 is configured to determine the final matching status 374 by combining model outputs and/feature representations from other models with the sequence of labels output by the global information-sound confidence model 360 and/or the global acoustic semantic feature representation extracted relative to an end unit in several units.

Exemplary Embodiment of Fusion Model

The fusion model 370 is configured to determine the final interaction confidence 372 and matching status 374 based on final model outputs or feature representations of the acoustic confidence model 330, the semantic confidence model 340, the local information-sound confidence model 350, and/or the global information-sound confidence model 360. Since each of the four models 330, 340, 350, and 360 has its own emphasis, the fusion model 370 may give a more accurate determination after fusing information of each model, thereby further improving performance.

The fusion model 370 may be established as a deep neural network, including one or more corresponding network layers, such as a convolutional layer, an RNN layer, a fully connected layer, an output layer, etc., so as to determine final outputs based on the inputs to the fusion model 370.

In some embodiments, the acoustic confidence model 330, the semantic confidence model 340, the local information-sound confidence model 350 and/or the global information-sound confidence model 360 may be trained first, and then the fusion model 370 may be added to the training. In some embodiments, end-to-end training may be performed on the acoustic confidence model 330, the semantic confidence model 340, the local information-sound confidence model 350, and/or the global information-sound confidence model 360 and the fusion model 370. Embodiments of the present disclosure are not limited in this regard.

In some embodiments, for the interaction confidence, by considering the matching status on the unit granularity of the recognized information 312 given by the local information-sound confidence model 350 and/or the global information-sound confidence model 360, it is also possible to determine a reliability that part of the sound signal 302 indicates speech for interaction with the voice interaction device 120, in addition to determining a reliability that the sound signal 302 as a whole indicates speech for interaction with the voice interaction device 120.

In detail, apart from outputting whether respective units in the recognized information 312 are corresponding sound segments correctly matching the sound signal 302, and overall errors presented by the units, the local information-sound confidence model 350 and/or the global information-sound confidence model 360 may also be configured to determine the reliability that each acoustic segment in the sound signal is used for human-machine interaction. The acoustic segments here may be aligned to respective units representing the recognized information. Since the positive sample of the training of the local information-sound confidence model 350 and/or the global information-sound confidence model 360 are related to the sound signal and information of human-machine interaction, such reliability may be determined. The output of the local information-sound confidence model 350 and/or the global information-sound confidence model 360 may be used by the fusion model 370 to determine the interaction confidence 372 more finely to indicate the reliability that the sound signal 302, as a whole or in part, indicates speech for interaction with the voice interaction device 120.

The determination of the reliability that part of the sound signal 302 indicates speech for interaction with the voice interaction device 120 helps to further improve the intelligence and accuracy of the response control of the voice interaction device 120. For example, if the voice interaction device 120 collects the voice instruction "I want to listen to . . . " issued by the user 110 and the speech " . . . hurry up to take clothes inside" of a conversation of other people in the environment where the user 110 is located, both the sound signal 302 and the corresponding recognized information may include "I want to listen to hurry up to take clothes inside". By determining, from the unit level, the confidence level of the acoustic segments of the sound signal used for voice interaction, it may be determined that the first half "I want to listen to" of the sound signal 302 is used for human-machine interaction, and the second half "hurry up to take clothes inside" is not used for human-machine interaction and do not need to be responded. With such an interaction confidence, the voice interaction device 120 may be controlled to ignore the second half of the sound signal 302, and only to respond to the first half of the sound signal 302. For example, the voice interaction device 120 may ask the user "what do you want to listen to?" again.

Exemplary Embodiment of Detection for Start Point and End Point

Generally, the conventional start point and end point detection technology determines an end of a voice instruction based on silence of the user. However, in a case where the user is hesitant when asking a question (at this time the voice instruction has not been completed), sound collection may be ended in advance, which will lead to subsequent frequent determinations of speech confidences and frequent determinations of sounds of non-voice interactions. Consequently, the user experience is bad, and resources of the interactive control apparatus 140 may be wasted.

Figure 9:
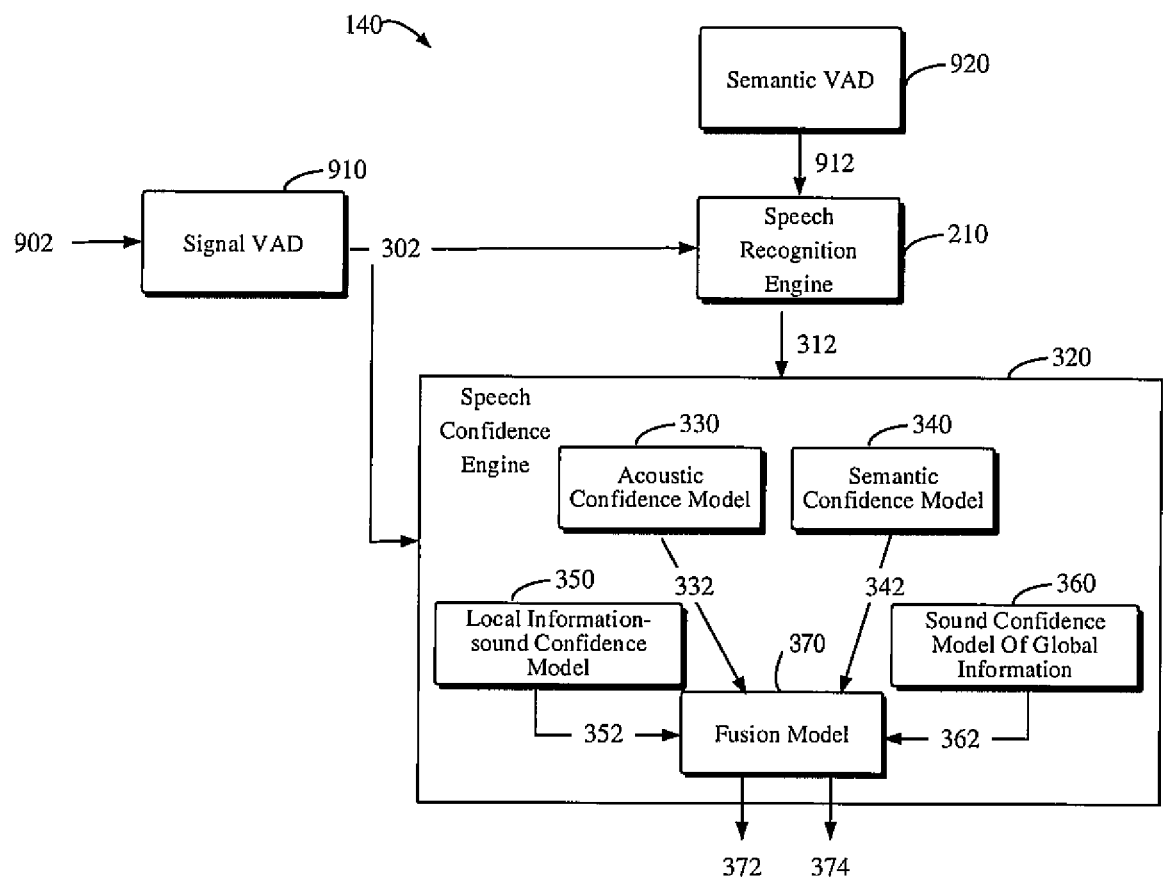
FIG. 9 is an example block diagram of an interactive control apparatus according to some other embodiments of the present disclosure.

In some embodiments of the present disclosure, the interactive control apparatus 140 may also be configured to detect an end of the voice of the user 110 during sound collection performed by the sound collector in the voice interaction device 120. FIG. 9 is an example of the interactive control apparatus 140. As illustrated in FIG. 9, the interactive control apparatus 140 includes an end signal voice activity detection (VAD) module 910 and a semantic VAD module 920.

When the sound collector 122 in the voice interaction device 120 does not detect any voice, the end signal VAD module 910 may be configured to partially filter out non-voice data. At this time, no sound signal is transmitted to the speech recognition engine 310. When the sound collector 122 detects a voice-like sound signal, the end signal VAD module 910 detects a start point of the sound, and continuously sends the collected original sound 902 to the speech recognition engine 310 as at least part of the sound signal 302. If the speech recognition engine 310 detects information from the currently obtained sound to be processed, currently recognized information to be processed may be provided to the semantic VAD module 920 for the semantic VAD module 920 to determine whether the information to be processed is semantically complete.

If the end signal VAD module 910 detects an end of a sound signal to be processed collected by the sound collector 122, and the semantic VAD module 920 determines that the information to be processed is semantically complete, the current sound signal 302 and the information recognized from the sound signal 302 312 are provided to the speech confidence engine 320 to control the voice interaction device 120 to respond as soon as possible, thereby realizing a quick interaction response of the device and lowering hesitation expectations of the user. In addition, by determining the voice confidence and controlling the response only when the end point is detected and the semantic meaning is complete, problems generated in scenes where the user hesitates to ask questions may be solved. For example, when the user pauses (for example, when the user makes sound "I want to listen to . . . "), due to the incomplete semantic meaning, although an end of the speech is detected, the voice interaction device 120 waits for a subsequent voice signal of the user, that is, waits for the user to complete the expression, rather than directly determining that the voice instruction of the user cannot be responded to.

In some embodiments, the signal VAD module 910 and/or the semantic VAD module 920 may also be implemented based on a machine learning model, for example, a CNN, a recurrent neural network (e.g., a LSTM), a fully connected network layer, etc. The signal VAD module 910 may be established as a classification model, where inputs to the model are sound signals and outputs are classifications of the sound signals. The classification of the sound signals may include, for example four types: no voice, a start point of voice, continuous voice, and an end point of voice. The classification of the sound signals may sometimes include other categories, such as a pause in the middle of voice. Feature representations extracted by the signal VAD module 910 from the inputs may include, for example, Mel frequency cepstral coefficients (MFCC) of the sound signal, and a perceptual linear prediction (PLP), and may also use a filter bank to extract acoustic features. Inputs to the semantic VAD module 920 are recognized information, and outputs are determinations of semantic completeness of the recognized information, which may be classifications composed of 0 or 1 (semantic completeness or semantic incompleteness), or continuous values ranging from 0 to 1 (probabilities of semantic completeness or incompleteness).

In some embodiments, especially in the case of one-wakeup-successive-interaction, since the voice interaction device 120 may also be emitting a sound in a time period during which the user may issue a voice instruction, the voice interaction device 120 may also be required to perform echo cancellation on an original signal collected by the sound collector 122, and then the sound signal obtained after the echo cancellation may be provided to the interactive control apparatus 140 at the local or remote end for processing. For example, such echo cancellation may be performed by the interactive control apparatus 140 at the local end of the voice interaction device 120.

Exemplary Embodiment of Interactive Voice-Control Apparatus

Figure 10:
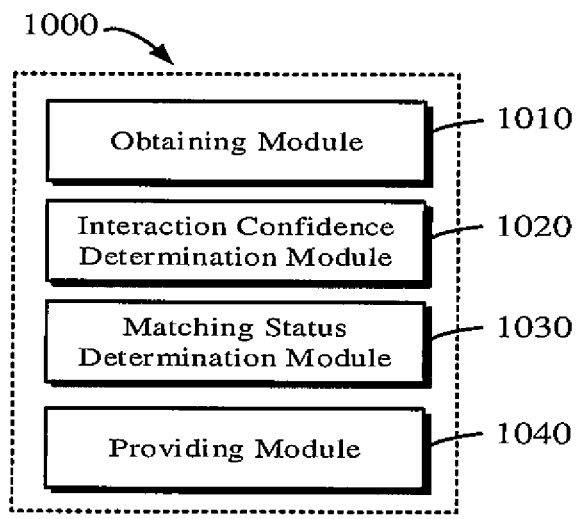
FIG. 10 is a block diagram of an interactive voice-control apparatus according to some embodiments of the present disclosure.

FIG. 10 is a block diagram of an interactive voice-control apparatus 1000 according to some embodiments of the present disclosure. The apparatus 1000 may be included in the interactive control apparatuses 140-1, 140-2 or the voice interaction device 120 illustrated in FIG. 1.

As illustrated in FIG. 10, the apparatus 1000 includes an obtaining module 1010, an interaction confidence determination module 1020, a matching status determination module 1030, and a providing module 1040. The obtaining module 1010 is configured to obtain a sound signal at a voice interaction device and recognized information recognized from the sound signal. The interaction confidence determination module 1020 is configured to determine an interaction confidence of the sound signal based on at least one of an acoustic feature representation of the sound signal and a semantic feature representation associated with the recognized information. The matching status determination module 1030 is configured to determine a matching status between the recognized information and the sound signal. The providing module 1040 is configured to provide the interaction confidence and the matching status for controlling a response of the voice interaction device to the sound signal.

In some embodiments, the interaction confidence determination module includes a first model execution module and a first fusion determination module. The first model execution module is configured to execute one or more of the following operations by using an acoustic confidence model: extracting the acoustic feature representation of the sound signal, and determining an acoustic confidence of a segment of voice having the sound signal for human-machine interaction based on the acoustic feature representation. The first fusion determination module is configured to determine the interaction confidence based on at least one of the acoustic feature representation and the acoustic confidence by using a fusion model.

In some embodiments, training of the acoustic confidence model is based on a first positive sample and a first negative sample. The first positive sample includes a sound signal for the human-machine interaction, and the first negative sample includes a sound signal for non-human-machine interaction.

In some embodiments, the interaction confidence determination module includes an information feature extraction module, a second model execution module and a second fusion determination module. The information feature extraction module is configured to extract the semantic feature representation associated with the recognized information. The second model execution module is configured to determine, based on the semantic feature representation, that the recognized information is a semantic confidence of information recognized from a segment of voice used for human-machine interaction by using a semantic confidence model. The second fusion determination module is configured to determine the interaction confidence based on at least one of the semantic feature representation and the semantic confidence by using a fusion model.

In some embodiments, training of the semantic confidence model is based on a second positive sample and a second negative sample. The second positive sample includes real information labeled from the sound signal for the human-machine interaction, and the second negative sample includes information for non-human-machine interaction.

In some embodiments, the recognized information is represented as a sequence of units. The sequence of units includes at least one unit, and each unit is selected from a group including items of: a word, a syllable, a grapheme, a phone, a sub-phone, a combined segment of phones, a combined segment of graphemes, and a context-sensitive unit of any of the above items. The matching status determination module includes a sound division module, a third model execution module, and a third fusion determination module. The sound division module is configured to divide the sound signal into at least one acoustic segment corresponding to the at least one unit in the sequence of units. Each unit is sequentially aligned with each acoustic segment to form at least one unit-acoustic segment pair. The third model execution module is configured to execute one or more of the following by using a local information-sound confidence model: extracting at least one unit-acoustic segment feature representation of the at least one unit-acoustic segment pair; and determining respective matching confidences of the at least one unit and the at least one acoustic segment based on the at least one unit-acoustic segment feature representation. The third fusion determination module is configured to determine the matching status based at least on at least one of the at least one unit-acoustic segment feature representation and the respective matching confidences by using a fusion model.

In some embodiments, the interaction confidence determination module includes a fourth fusion determination module. The fourth fusion determination module is configured to determine, by using the fusion model, the interaction confidence based on at least one of the acoustic feature representation and the semantic feature representation and at least one of the at least one unit-acoustic segment feature representation and the respective matching confidences to indicate at least one of: the reliability that the sound signal as a whole indicates speech for interaction with the voice interaction device; and the reliability that part of the sound signal indicates speech for interaction with the voice interaction device.

In some embodiments, the fourth fusion determination module is configured to determine, by using the fusion model, the matching status based on at least one of the acoustic feature representation and the semantic feature representation and at least one of the at least one unit-acoustic segment feature representation and the respective matching confidences.

In some embodiments, training of the local information-sound confidence model is based on a third positive sample and a third negative sample. The third positive sample includes a first acoustic segment in a sound signal for human-machine interaction and a first unit labeled from the first acoustic segment. The third negative sample includes a second acoustic segment and a second unit different from any unit present in the second acoustic segment.

In some embodiments, the recognized information is represented as a sequence of units. The sequence of units includes at least one unit. Each unit is selected from a group including items of: a word, a syllable, a grapheme, a phone, a sub-phone, a combined segment of phones, a combined segment of graphemes, and a context-sensitive unit of any of the above items. The matching status determination module includes a fourth model execution module and a fifth fusion determination module. The fourth model execution module is configured to execute one or more of the following by using a global information-sound confidence model: extracting a global acoustic semantic feature representation based on the acoustic feature representation and the semantic feature representation, and generating a sequence of labels based on the global acoustic semantic feature representation. The sequence of labels includes matching labels corresponding to the sequence of units, a start label and an end label. Each of the matching labels indicates whether each unit in the sequence of units matches a corresponding acoustic segment in the sound signal. The start label indicates whether a start unit in the sequence of units appears at a start position of the sound signal, and the end label indicates whether a last unit in the sequence of units appears at an end position of the sound signal. The fifth fusion determination module is configured to determine the matching status based at least on at least one of the global acoustic semantic feature representation and the sequence of labels by using a fusion model.

In some embodiments, the sequence of units includes a plurality of units. The fourth model execution module is configured to generate the sequence of labels to further include at least one adjacency indicating label between matching labels of two adjacent units in the plurality of units. The at least one adjacency indicating label indicates whether the two adjacent units in the plurality of units appear at adjacent positions in the sound signal.

In some embodiments, the interaction confidence determination module includes a sixth fusion determination module. The sixth fusion determination module is configured to determine, by using the fusion model, the interaction confidence based on at least one of the acoustic feature representation and the semantic feature representation and at least one of the global acoustic semantic feature representation and the sequence of labels to indicate at least one of: the reliability that the sound signal as a whole indicates speech for interaction with the voice interaction device; and the reliability that part of the sound signal indicates speech for interaction with the voice interaction device.

In some embodiments, training of the global information-sound confidence model is based on a fourth positive sample and a fourth negative sample. The fourth positive sample includes a first sound signal for human-machine interaction, first information labeled from the first sound signal, and a correct sequence of labels generated with respect to the first information and the first sound signal. The fourth negative sample includes a combination of a sound signal, information and a sequence of labels other than the first sound signal, the first information and the correct sequence of labels in the fourth positive sample.

In some embodiments, the obtaining module includes an end determination module, a semantic completeness detection module and a sound and information determination module. The end determination module is configured to, during sound collection of a sound collector in the voice interaction device, determine an end of a sound signal to be processed collected by the sound collector. The semantic completeness detection module is configured to determine whether information to be processed recognized from the sound signal to be processed is semantically complete. The sound and information determination module is configured to, in response to determining that the information to be processed is semantically complete, determine the sound signal to be processed as the sound signal and determine the information to be processed as the recognized information.

In some embodiments, the apparatus 1000 further includes a waiting and obtaining module. The waiting and obtaining module is configured to, in response to determining that the information to be processed is semantically incomplete, wait and obtain a subsequent sound signal to be processed collected by the sound collector.

In some embodiments, the sound signal to be processed is generated after the voice interaction device performs echo cancellation on an original signal collected by the sound collector.

In some embodiments, the recognized information includes text information.

In some embodiments, the apparatus 1000 further includes a response determination module. The response determination module is configured to, in response to determining that the interaction confidence is lower than a predetermined confidence threshold, control the voice interaction device not to respond to the sound signal, and in response to determining that the interaction confidence exceeds the predetermined confidence threshold, determine a response to the sound signal to be provided by the voice interaction device based on the matching status. The response includes direct feedback to the sound signal or guidance feedback to a user of the voice interaction device, and the guidance feedback guides the user to clarify a desired instruction to the voice interaction device.

Exemplary Embodiment of Device

Figure 11:
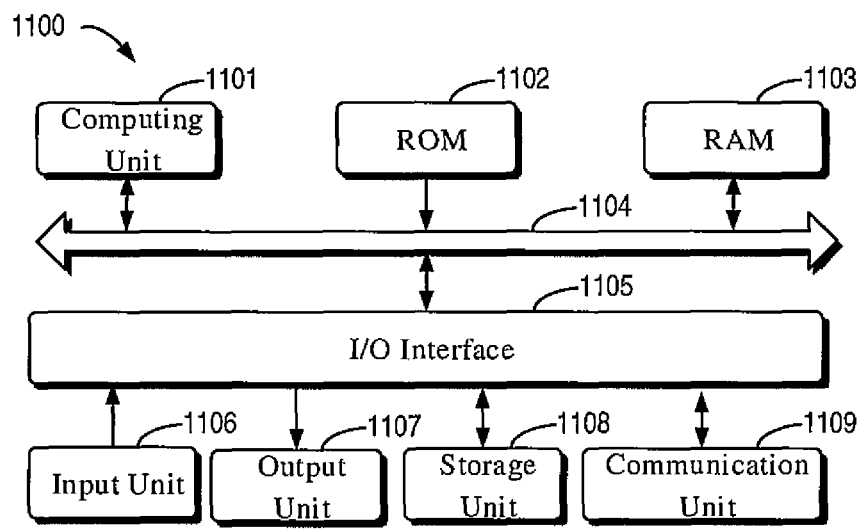
FIG. 11 is a block diagram of a device capable of implementing embodiments of the present disclosure.

FIG. 11 is a block diagram of an example device 1100 capable of implementing embodiments of the present disclosure. The device 1100 may be configured to implement the interactive control apparatuses 140-1, 140-2 or the voice interaction device 120 as illustrated in FIG. 1.

As illustrated in FIG. 11, the device 1100 includes a computing unit 1101, which may perform various suitable actions and processes in accordance with computer program instructions stored in a read only memory (ROM) 1102 or loaded from a storage unit 1108 into a random access memory (RAM) 1103. In the RAM 1103, various programs and data necessary for operations of the device 1100 may also be stored. The CPU 1101, the ROM 1102, and the RAM 1103 are connected to each other through a bus 1104. An input/output (I/O) interface 1105 is also connected to the bus 1104.

A number of components in the device 1100 are connected to the 110 interface 1105, including: an input unit 1106 such as a keyboard, a mouse, and the like; an output unit 1107 such as various types of displays, speakers, etc.; the storage unit 1108 such as a magnetic disk, an optical disk, or the like; and a communication unit 1109 such as a network card, a modem, a wireless communication transceiver, and so on. The communication unit 1109 allows the device 1100 to exchange information/data with other devices via a computer network such as the Internet and/or various telecommunications networks.

The computing unit 1101 may be various general-purpose and/or special-purpose processing components with processing and computing capabilities. Some examples of the computing unit 1101 include, but are not limited to, central processing units (CPUs), graphics processing units (GPUs), various dedicated artificial intelligence (AI) computing chips, various computing units running machine learning model algorithms, digital signal processors (DSPs), and any suitable processor, controller, microcontroller, and so on. The computing unit 1101 performs various methods and processes described above, such as the process 200. For example, in some embodiments, the process 200 may be implemented as a computer software program, which is tangibly included in a machine-readable medium, such as the storage unit 1108. In some embodiments, part or the entire computer program may be loaded and/or installed on the device 1100 via the ROM 1102 and/or the communication unit 1109. When the computer program is loaded into the RAM 1103 and executed by the computing unit 1101, one or more steps of the process 200 described above may be performed. Alternatively, in other embodiments, the computing unit 1101 may be configured to perform the process 200 by any other suitable means (e.g., by means of firmware).

The functions described herein above may be performed, at least in part, by one or more hardware logic components. For example, and without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), and the like.

Program codes for performing the method in the present disclosure may be written in any combination of one or more programming languages. These program codes may be provided to a processor or controller in a general-purpose computer, a special purpose computer, or other programmable data processing devices, such that the program codes, when executed by the processor or controller, are configured to implement functions/operations specified in the flow chart and/or block diagrams. The program code may be executed entirely on a machine, partly on the machine, as a separate software package, partly on the machine, partly on a remote computer, or entirely on the remote computer or server.

In the context of the present disclosure, the machine-readable medium may be a tangible medium that may contain, or store a program for use by or in combination with an instruction execution system, an apparatus, or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include: an electrical connection having one or more wires, a portable computer disk, a hard disk, a random access memory (RAM), a read only memory (ROM), an Erasable Programmable Read Only Memory (EPROM or a flash memory), an optical fiber, a compact disc read-only memory (CD-ROM), an optical memory component, a magnetic memory component, or any suitable combination thereof.

Moreover, while operations are described in a particular order, this should be understood as that the operations are required to be performed in a particular illustrated order or in a sequential order, or that all illustrated operations are required to be performed to achieve desirable results. In certain circumstances, multitasking and parallel processing may be advantageous. Likewise, while several specific implementation details are included in the above discussion, these should not be construed as limiting the scope of the present disclosure. Certain features described in the context of separate embodiments may also be implemented in combination in a single implementation. Conversely, features that are described in the context of the single implementation may also be implemented in a plurality of implementations separately or in any suitable sub-combination.

Although the subject matter has been described in a language specific to structural features and/or methodological acts, it is to be understood that the subject matter defined in the attached claims is not necessarily limited to the specific features or acts described above. Instead, the specific features and acts described above are merely exemplary forms for implementing the attached claims.

What is claimed is:

1. An interactive voice-control method, comprising:
    obtaining a sound signal at a voice interaction device and recognized information that is recognized from the sound signal;
    determining an interaction confidence of the sound signal based at least on at least one of an acoustic feature representation of the sound signal and a semantic feature representation associated with the recognized information;
    determining a matching status between the recognized information and the sound signal; and
    providing the interaction confidence and the matching status for controlling a response of the voice interaction device to the sound signal.

2. The method of claim 1, wherein determining the interaction confidence comprises:
    executing one or more of the following operations by using an acoustic confidence model:
        extracting the acoustic feature representation of the sound signal, and
        determining an acoustic confidence that the sound signal indicates speech for human-machine interaction, based on the acoustic feature representation; and
    determining the interaction confidence based on at least one of the acoustic feature representation and the acoustic confidence by using a fusion model.

3. The method of claim 2, wherein the acoustic confidence model is trained based on a first positive sample and a first negative sample, the first positive sample comprising a sound signal for the human-machine interaction, and the first negative sample comprising a sound signal for non-human-machine interaction.

4. The method of claim 1, wherein determining the interaction confidence comprises:
    extracting the semantic feature representation associated with the recognized information;
    determining a semantic confidence that the recognized information is information recognized from speech for human-machine interaction, based on the semantic feature representation by using a semantic confidence model; and
    determining the interaction confidence based on at least one of the semantic feature representation and the semantic confidence by using a fusion model.

5. The method of claim 4, wherein the semantic confidence model is trained based on a second positive sample and a second negative sample, the second positive sample comprising real information labeled from the sound signal for the human-machine interaction, and the second negative sample comprising information for non-human-machine interaction.

6. The method of claim 1, wherein the recognized information is represented as a sequence of units comprising at least one unit, each unit being selected from a group comprising: a word, a syllable, a grapheme, a phone, a sub-phone, a combined segment of phones, a combined segment of graphemes, and a context-sensitive unit of any of the above items, and
    wherein, determining the matching status comprises:
        dividing the sound signal into at least one acoustic segment corresponding to the at least one unit in the sequence of units, respectively, each unit being sequentially aligned with each acoustic segment to form at least one unit-acoustic segment pair;
        executing one or more of following operations by using a local information-sound confidence model:
            extracting at least one unit-acoustic segment feature representation of the at least one unit-acoustic segment pair; and
            determining respective matching confidences of the at least one unit and the at least one acoustic segment based on the at least one unit-acoustic segment feature representation; and
        determining the matching status based at least on at least one of the at least one unit-acoustic segment feature representation and the respective matching confidences by using a fusion model.

7. The method of claim 6, wherein determining the interaction confidence comprises:
    determining the interaction confidence based on at least one of the acoustic feature representation and the semantic feature representation and with respect to at least one of the at least one unit-acoustic segment feature representation and the respective matching confidences, by using the fusion model, to indicate at least one of:
the reliability that the sound signal as a whole indicates speech for interaction with the voice interaction device; and
the reliability that part of the sound signal indicates speech for interaction with the voice interaction device.

8. The method of claim 6, wherein determining the matching status based on at least one of the at least one unit-acoustic segment feature representation and the respective matching confidences comprises:
determining, by using the fusion model, the matching status based on at least one of the acoustic feature representation and the semantic feature representation and based on at least one of the at least one unit-acoustic segment feature representation and the respective matching confidences.

9. The method of claim 6, wherein the local information-sound confidence model is trained based on a third positive sample and a third negative sample, the third positive sample comprising a first acoustic segment in a sound signal for human-machine interaction and a first unit labeled from the first acoustic segment, and the third negative sample comprising a second acoustic segment and a second unit different from any unit present in the second acoustic segment.

10. The method of claim 1, wherein the recognized information is represented as a sequence of units comprising at least one unit, and each unit being selected from a group comprising: a word, a syllable, a grapheme, a phone, a sub-phone, a combined segment of phones, a combined segment of graphemes, and a context-sensitive unit of any of the above items, and determining the matching status comprises:
executing one or more of the following operations by using a global information-sound confidence model:
extracting a global acoustic semantic feature representation based on the acoustic feature representation and the semantic feature representation, and
generating a sequence of labels based on the global acoustic semantic feature representation, the sequence of labels comprising matching labels, a start label and an end label corresponding to the sequence of units, each matching label indicating whether each unit in the sequence of units matches a corresponding acoustic segment in the sound signal, the start label indicating whether a start unit in the sequence of units is present at a start position of the sound signal, and the end label indicating whether a last unit in the sequence of units is present at an end position of the sound signal; and
determining the matching status based at least on at least one of the global acoustic semantic feature representation and the sequence of labels by using a fusion model.

11. The method of claim 10, wherein the sequence of units comprises a plurality of units, and generating the sequence of labels comprises:
generating the sequence of labels such that the sequence of labels further comprise at least one adjacency indicating label between matching labels of two adjacent units in the plurality of units, each adjacency indicating label indicating whether the two adjacent units in the plurality of units are present at adjacent positions in the sound signal.

12. The method of claim 10, wherein determining the interaction confidence comprises:
determining, by using the fusion model, the interaction confidence based on at least one of the acoustic feature representation and the semantic feature representation and based on at least one of the global acoustic semantic feature representation and the sequence of labels to indicate at least one of:
the reliability that the sound signal as a whole indicates speech for interaction with the voice interaction device; and
the reliability that part of the sound signal indicates speech for interaction with the voice interaction device.

13. The method of claim 10, wherein the global information-sound confidence model is trained based on a fourth positive sample and a fourth negative sample, the fourth positive sample comprising a first sound signal for human-machine interaction, first information labeled from the first sound signal, and a correct sequence of labels generated with respect to the first information and the first sound signal, and the fourth negative sample comprising a combination of a sound signal, information and a sequence of labels other than the first sound signal, the first information and the correct sequence of labels in the fourth positive sample.

14. The method of claim 1, wherein obtaining the sound signal and the recognized information comprises:
determining an end of a sound signal to be processed that is collected by a sound collector in the voice interaction device, during sound collection of the sound collector;
determining whether information to be processed that is recognized from the sound signal to be processed is semantically complete; and
in response to the determination that the information to be processed is semantically complete, determining the sound signal to be processed as the sound signal and determining the information to be processed as the recognized information.

15. The method of claim 14, further comprising:
in response to the determination that the information to be processed is semantically incomplete, waiting and obtaining a subsequent sound signal to be processed that is collected by the sound collector.

16. The method of claim 14, wherein the sound signal to be processed is generated after the voice interaction device performs echo cancellation on an original signal collected by the sound collector.

17. The method of claim 1, wherein the recognized information comprises text information.

18. The method of claim 1, further comprising:
in response to the determination that the interaction confidence is lower than a predetermined confidence threshold, controlling the voice interaction device not to respond to the sound signal; and
in response to the determination that the interaction confidence exceeds the predetermined confidence threshold, determining a response to the sound signal to be provided by the voice interaction device based on the matching status, the response comprising direct feedback to the sound signal or guidance feedback to a user of the voice interaction device, and the guidance feedback guiding the user to clarify a desired instruction issued to the voice interaction device.

19. An interactive voice-control apparatus, comprising:
one or more processors; and
a storage device, configured to store one or more programs, wherein, when the one or more programs are executed by the one or more processors, the one or more processors are configured to implement an interactive voice-control method, comprising:

obtaining a sound signal at a voice interaction device and recognized information that is recognized from the sound signal;

determining an interaction confidence of the sound signal based at least on at least one of an acoustic feature representation of the sound signal and a semantic feature representation associated with the recognized information;

determining a matching status between the recognized information and the sound signal; and providing the interaction confidence and the matching status for controlling a response of the voice interaction device to the sound signal.

20. A tangible, non-transitory computer readable storage medium having a computer program stored thereon, wherein, when the program is executed by a processor, the program implements an interactive voice-control method, comprising:

obtaining a sound signal at a voice interaction device and recognized information that is recognized from the sound signal;

determining an interaction confidence of the sound signal based at least on at least one of an acoustic feature representation of the sound signal and a semantic feature representation associated with the recognized information;

determining a matching status between the recognized information and the sound signal; and providing the interaction confidence and the matching status for controlling a response of the voice interaction device to the sound signal.

* * * * *